United States Patent [19]

Reimers

[11] Patent Number: 5,859,134
[45] Date of Patent: Jan. 12, 1999

[54] POLYMERS WHICH ARE DISPERSIBLE IN AQUEOUS SOLVENTS AND PHOTOCURABLE ELEMENTS COMPRISING SAME

[75] Inventor: Jay L. Reimers, Atlanta, Ga.

[73] Assignee: Polyfibron Technologies, Inc., Atlanta, Ga.

[21] Appl. No.: 820,227

[22] Filed: Mar. 18, 1997

[51] Int. Cl.$^6$ ....................................................... C08F 8/42
[52] U.S. Cl. ............................ 525/102; 430/286; 430/287; 430/288; 525/104; 525/105; 525/330.8; 525/333.1; 525/333.2; 525/342; 525/370; 525/386
[58] Field of Search ............................. 525/320.8, 333.1, 525/333.2, 102, 104, 105, 342, 370, 386; 430/286, 287, 288

[56] References Cited

U.S. PATENT DOCUMENTS

| | | | |
|---|---|---|---|
| 4,272,608 | 6/1981 | Proskow | 430/288 |
| 4,281,087 | 7/1981 | Heuschen et al. | 525/91 |
| 4,691,002 | 9/1987 | Hegemann et al. | 528/289 |
| 4,857,434 | 8/1989 | Klinger | 430/286 |
| 4,883,859 | 11/1989 | Audry et al. | 525/333.2 |
| 5,407,784 | 4/1995 | Berrier et al. | 430/287 |
| 5,462,835 | 10/1995 | Mirle et al. | 430/287 |
| 5,587,433 | 12/1996 | Boeckeler | 525/333.2 |

*Primary Examiner*—Bernard Lipman
*Attorney, Agent, or Firm*—Woodcock Washburn Kurtz Mackiewicz & Norris LLP

[57] ABSTRACT

Ionomeric polymers are provided which are dispersible in aqueous solvents yet which cross-link with ethylenically unsaturated monomers to form matrices having relatively low solubility in such solvents. The polymers can be incorporated into photocurable composition for use, for example, in photocurable printing elements.

28 Claims, 1 Drawing Sheet

POLYMERS WHICH ARE DISPERSIBLE IN AQUEOUS SOLVENTS AND PHOTOCURABLE ELEMENTS COMPRISING SAME

FIELD OF THE INVENTION

The present invention is directed to polymers which are dispersible in aqueous solvents, to synthetic techniques for such polymers, and to the use of such polymers in photocurable elements.

BACKGROUND OF THE INVENTION

Photocurable compositions are well known in the art for forming printing plates and other photosensitive articles. In the field of photosensitive flexographic printing plates, the uncured plate typically includes a support and a photocurable surface or layer. Additional layers or surfaces on the plate can include, for example, slip films and/or release layers to protect the photocurable surface. Prior to processing the plate, the release layer typically is removed, and the photocurable layer is exposed to radiation in an imagewise fashion. Unexposed areas of the photocurable layer are then removed in developer baths.

In the past, unexposed ares of the photocurable layer were removed using developer baths comprising organic solvents. However, the toxicity, volatility, and low flash point of such solvents gave rise to hazardous conditions and polution problems. As a result, there has been a recognition in the art of the need to provide photocurable compositions which can be developed in, for example, aqueous solvents.

A flexographic printing plate not only should possess a photocurable layer which can be developed in aqueous solvents, but also should have sufficient flexibility to wrap around a printing cylinder and sufficient structural integrity to withstand the rigors experienced during typical printing processes. The printing plate also should be soft enough to facilitate ink transfer during printing, and should exhibit solvent resistant to inks, including resistance to the various organic and aqueous-based inks which are used in flexographic printing.

Many of the aqueous developable compositions reported to date have not possessed a sufficient balance of these desired properties. Consequently, there still remains a need in the art for photocurable polymers which can be dispersed in aqueous solvents and exhibit an appropriate balance of the other properties required for the production of flexographic printing plates.

OBJECTS OF THE INVENTION

It is one object of the present invention to provide polymers which are dispersible in aqueous solvents.

It is a another object of the invention to provide polymers which cross-link with reactive monomers upon exposure to actinic radiation and, preferably, thereby become insoluble in aqueous solvents.

It is a further object to provide polymers which, when cross-linked with reactive monomers, form matrices which swell only minimally upon exposure to organic and aqueous solvents.

It is yet another object to provide processes for preparing polymers which can be dispersed in aqueous solvents.

It is still another object to provide photocurable elements such as photocurable printing plates comprising aqueous-developable polymers.

BRIEF DESCRIPTION OF THE INVENTION

These and other objects are satisfied by the present invention, which provides ionomeric polymers which are dispersible in aqueous solvents yet which cross-link with ethylenically unsaturated monomers to form matrices having relatively low solubility in such solvents.

In certain embodiments, the polymers of the invention have formula (1):

 (1)

where:

I is an elastomer having a glass transition temperature of about $-30°$ C. or less;

each i, independently, is NH, $NR_i$, O, or S;

$R_1$ is alkyl having 1 to about 10 carbon atoms, cycloalkyl or heterocycloalkyl having 4 to about 6 carbon atoms, or aryl having 3 to about 20 carbon atoms;

each II, independently, is $O(O)C-C(O)-$, $O(O)S-S(O)-$, $O(O)C-R_{II}-C(O)-$, $O(O)S-R_{II}-S(O)-$, $O(O)S-R_{II}-C(O)-$, $O(O)C-R_{II}-S(O)-$, $O(O)_2S-R_{II}-$, or can have one of the formulas:

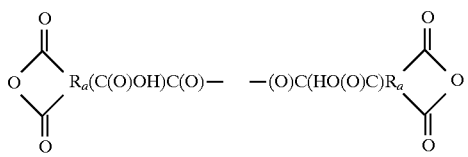

$R_{II}$ is alkyl having 1 to about 10 carbon atoms, cycloalkyl having 4 to about 10 carbon atoms, alkenyl having 2 to about 10 carbon atoms, or aryl having 3 to about 20 carbon atoms;

$R_a$ is an aryl group having 6 to about 14 carbon atoms;

each III, independently, is M, MY, $MY_2$, $N(R_{III})_3$, $NH(R_{III})_2$, $NH_2(R_{III})$, $NH_3$, $NH-R_{III}-NH_2$, $N-(R_{III})_2-NH$, $Si(R_{III})_3$, $Si(R_{III})_2Y$, $Si(R_{III})Y_2$, $Sn(R_{III})_3$, $Sn(R_{III})_2Y$, $Sn(R_{III})Y_2$;

M is Na, K, Zn, Ca, Cs, Mg, or Rb;

Y is OH, F, Cl, Br, I, an acetate, an acetyl acetonate, a sulfate, a chorate, a nitrate, enoxy, an oxime, or an amine; and $R_{III}$ is alkyl having 1 to about 10 carbon atoms, alkenyl having 2 to about 10 carbon atoms, or aryl having 3 to about 20 carbon atoms.

In other embodiments, the polymers of the invention have formula (2):

 (2)

where:

I is an elastomer having a glass transition temperature of about $-30°$ C. or less;

each ii, independently, is $-C(O)-$ or $-S(O)_2-$;

each IV, independently, is $-HN-R_{IV}-NH_2$, $-R_{IV}-N-R_{IV}-NHR_{IV}$, $-O-R_{IV}-OH$, $-O-R_{IV}-OR_{II}$, $-S-R_{IV}-SH$, or $-S-R_{IV}-SR_{IV}$;

each $R_{IV}$ independently, is alkyl having 1 to about 10 carbon atoms, cycloalkyl having 4 to about 10 carbon atoms, alkenyl having 2 to about 10 carbon atom, or aryl having 3 to about 20 carbon atoms;

each V, independently, is $Si(R_V)_3$, $Si(R_V)_2Y$, $Si(R_V)Y_2$, $Sn(R_V)_3$, $Sn(R_V)_2Y$, $Sn(R_V)Y_2$; and $R_V$ is alkyl having 1 to about 10 carbon atoms, alkenyl having 2 to about 10 carbon atoms, or aryl having 3 to about 20 carbon atoms.

In further embodiments, the polymers of the invention have formula (3):

[VI]-[iii]-[I]-[iii]-[VI]   (3)

where:

I is an elastomer having a glass transition temperature of about –30° C. or less;

each iii, independently, is NH, $NR_i$, O, or S;

$R_i$ is alkyl having 1 to about 10 carbon atoms, cycloalkyl or heterocycloalkyl having 4 to about 6 carbon atoms, or aryl having 3 to about 20 carbon atoms;

each VI, independently, is $Si(R_{VI})_3$, $Si(R_{VI})_2Y$, $Si(R_{VI})Y_2$, $Sn(R_{VI})_3$, $Sn(R_{VI})_2Y$, $Sn(R_{VI})Y_2$; and $R_{VI}$ is alkyl having 1 to about 10 carbon atoms, alkenyl having 2 to about 10 carbon atoms, or aryl having 3 to about 20 carbon atoms.

In still further embodiments, the polymers of the invention have formula (4):

[VII]-[iv]-[I]-[iv]-[VII]   (4)

where:

I is an elastomer having a glass transition temperature of about –30° C. or less;

each iv, independently, is —C(O)— or —S(O)$_2$—;

each VII, independently, is $Si(R_{VII})_3$, $Si(R_{VII})_2Y$, $Si(R_{VII})Y_2$, $Sn(R_{VII})_3$, $Sn(R_{VII})_2Y$, $Sn(R_{VII})Y_2$; and $R_{VII}$ is alkyl having 1 to about 10 carbon atoms, alkenyl having 2 to about 10 carbon atoms, or aryl having 3 to about 20 carbon atoms.

The present invention also provides compositions comprising the foregoing polymers, at least one ethylenically unsaturated monomer, and, preferably, at least one photoinitiator. In preferred embodiments, such compositions are disposed upon a support layer to form photocurable elements. The present invention provides both processes for developing such photocurable elements and the developed elements thus produced. In one embodiment, the elements are developed by exposing portions of the photocurable composition to actinic radiation for a time and under conditions effective to render the exposed portions substantially insoluble in an aqueous solvent (i.e., a solvent containing more than about 80 weight percent water).

The present invention also provides processes for preparing polymers having formulas (1)–(4). In one embodiment, polymers having formula (1) are prepared by processes comprising the steps of:

providing a first component having formula:

[i']-[I]-[i']

wherein I is as defined above and each i', independently, is NH$_2$, NHR$_i$, OH, or SH;

forming a reaction product by reacting the first component with a second component having formula HO(O)C—C(O)OH, HO(O)C—C(O)X, HO(O)S—S(O)OH, HO(O)S—S(O)X, HO(O)C—R$_{II}$13 C(O)OH, HO(O)C—R$_{II}$—C(O)X, HO(O)S—R$_{II}$—S(O)OH, HO(O)S—R$_{II}$—S(O)X, HO(O)S—R$_{II}$—C(O)OH, HO(O)S—R$_{II}$—C(O)X, HO(O)C—C R$_{II}$—S(O)OH, HO(O)C—R$_{II}$—S(O)X, or one of the formulas:

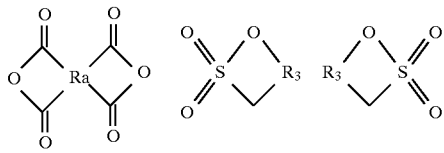

and forming the polymer by reacting the reaction product with a third component having formula MY, MY$_2$, MY$_3$, N(R$_{III}$)$_3$Y, NH(R$_{III}$)$_2$Y, NH$_2$(R$_{III}$)Y, YNH—R$_{III}$—NH$_2$, Y$_2$N—(R$_{III}$)$_2$—NH, Si(R$_{III}$)$_3$Y, Si(R$_{III}$)$_2$Y$_2$, Si(R$_{III}$)Y$_3$, Sn(R$_{III}$)$_3$Y, Sn(R$_{III}$)$_2$Y$_2$, Sn(R$_{III}$)Y$_3$.

Polymers having formula (2) are prepared in accordance with the invention by processes comprising the steps of:

providing a first component having formula:

[ii']-[I]-[ii']

wherein each ii', independently, —C(O)OH, —C(O)X, —S(O)$_2$OH, or —S(O)$_2$X; and forming a reaction product by reacting the first component with a second component having formula H$_2$N—R$_{IV}$—NH$_2$, HR$_{IV}$N—R$_{IV}$—NHR$_{IV}$, HO—R$_{IV}$—OH, R$_{IV}$O—R$_{IV}$—OR$_{IV}$, HS—R$_{IV}$—SH, or R$_{IV}$S—R$_{IV}$—SR$_{IV}$; and forming the polymer by reacting the reaction product with a third component having formula MY, MY$_2$, MY$_3$, Si(R$_V$)$_3$Y, Si(R$_V$)$_2$Y$_2$, Si(R$_V$)Y$_3$, Sn(R$_V$)$_3$Y, Sn(R$_V$)$_2$Y$_2$, Sn(R$_V$)Y$_3$.

Polymers having formula (3) are prepared in accordance with the invention by processes comprising the steps of:

providing a first component having formula:

[iii']-[I]-[iii']

where each iii', independently, is NH$_2$, NHR$_i$, OH, or SH; and reacting the first component with a second component having formula Si(R$_{VI}$)$_3$Y, Si(R$_{VI}$)$_2$Y$_2$, Si(R$_{VI}$)Y$_3$, Sn(R$_{VI}$)$_3$Y, Sn(R$_{VI}$)$_2$Y$_2$, Sn(R$_{VI}$)Y$_3$.

Polymers having formula (4) are prepared in accordance with the invention by processes comprising the steps of:

providing a first component having formula:

[iv']-[I]-[iv']

wherein each iv', independently, is —C(O)OH, —C(O)X, —S(O)$_2$OH, or —S(O)$_2$X; and reacting the first component with a second component having formula Si(R$_{VII}$)$_3$Y, Si(R$_{VII}$)$_2$Y$_2$, Si(R$_{VII}$)Y$_3$, Sn(R$_{VII}$)$_3$Y, Sn(R$_{VII}$)$_2$Y$_2$, Sn(R$_{VII}$)Y$_3$.

BRIEF DESCRIPTION OF THE DRAWINGS

The numerous objects and advantages of the present invention may be better understood by those skilled in the art by reference to the accompanying non-scale figures, in which.

DETAILED DESCRIPTION OF THE INVENTION

Figure 1:
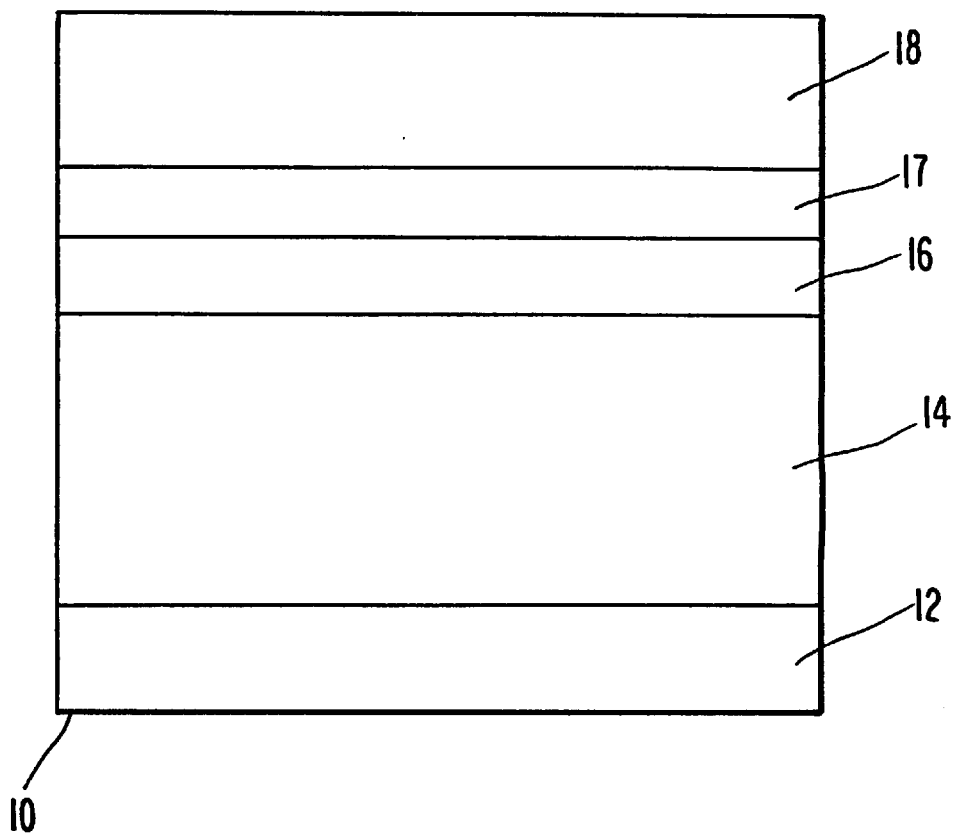
FIG. 1 is a cross-sectional view of a photocurable element according to the invention.

In accordance with the present invention, variable I is an elastomer having a glass transition temperature of about –30° C. or less, more preferably about –50° C. or less.

Elastomers according to the invention are materials, such as synthetic rubbers or plastics, which at room temperature can be stretched under low stress to at least twice their original length and, upon immediate release of the stress, will return to their approximate original length. The term "glass transition temperature" is used herein in its conventional sense, that is, the temperature at which there is a change in an amorphous region of a partially crystalline polymer from a viscous or rubbery condition to a hard and relative brittle one. Preferred elastomers are homopolymers or copolymers having ethylenic unsaturation, including homopolymers and copolymers of butadiene, isoprene, chloroprene, and/or polyisobutylene, ethylene propylene diene monomer (EPDM). Particularly preferred are butadienyl elastomers are which are commercially available from the B.F. Goodrich Co. under the tradename HYCAR and those available from Elf Atochem N.A. under the trade name R-45HT.

Variables i and iii can be NH, $NR_i$, O, or S (preferably NH or $NR_i$), and variables ii, and iv can be —C(O)— or —S(O)$_2$—(preferably —C(O)—) . $R_i$, in turn, can be alkyl having 1 to about 10 carbon atoms, cycloalkyl or heterocycloalkyl having 4 to about 6 carbon atoms, or aryl having 3 to about 20 carbon atoms, with alkyl groups being preferred. Alkyl groups according to the invention are substituted and unsubstituted straight chain and branched chain hydrocarbons such as methyl, ethyl, propyl, butyl, pentyl, hexyl, heptyl, octyl, nonyl, decyl, isopropyl, 2-butyl, isobutyl, 2-methylbutyl, isopentyl, 2-methylpentyl, 3-methylpentyl, 2-ethylhexyl and 2-propylpentyl groups. Preferred alkyl groups have 1 to about 6 carbon atoms. Cycloalkyl groups are cyclic alkyl groups such as cyclopropyl, cyclopentyl and cyclohexyl groups. Heterocycloalkyl groups are cycloalkyl groups which additionally include an atom (such as N, O, or S) that is not carbon. Aryl groups according to the invention are aromatic groups including, for example, benzyl, imidazolyl, naphthyl, phenyl, pyridyl, pyrimidinyl, and xylyl groups and substituted derivatives thereof, particularly those substituted with alkyl, alkoxy, amino, and nitro groups. Prefered aryl groups have 6 to about 14 carbon atoms.

Variable II can be O(O)C—C(O)—, O(O)S—S(O)—, O(O)C—$R_{II}$—C(O)—, O(O)S—$R_{II}$—S(O)—, O(O)S—$R_{II}$—C(O)—, O(O)C—$R_{II}$—S(O)—, O(O)$_2$S—$R_{II}$—, or can have one of the formulas:

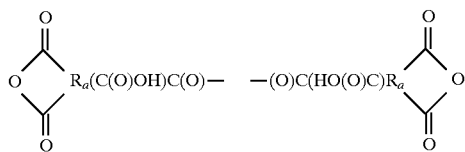

$R_{II}$ and $R_{IV}$ can be alkyl having 1 to about 10 (preferably about 1 or 2) carbon atoms, cycloalkyl having 5 to about 10 carbon atoms, alkenyl having 2 to about 10 (preferably about 2–4) carbon atoms, or aryl having 6 to about 20 carbon atoms. Alkenyl groups according to the invention are substituted and unsubstituted straight chain and branched chain hydrocarbons including at least one carbon-carbon double bond such as, for example, ethenyl, methylethenyl (allyl), dimethylethenyl, and butadienyl groups. $R_{II}$ preferably has a molecular weight of about 400 or less, more preferably 30–200.

$R_a$ can be an aryl group having 6 to about 14 carbon atoms, preferably a phenyl group.

Variable III can be M, MY, MY$_2$, N($R_{III}$)$_3$, NH($R_{III}$)$_2$, NH$_2$($R_{III}$), NH$_3$, NH—$R_{III}$—NH$_2$, N—($R_{III}$)$_2$—NH, Si($R_{III}$)$_3$, Si($R_{III}$)$_2$Y, Si($R_{III}$)Y$_2$, Sn ($R_{III}$)$_3$, Sn($R_{III}$)$_2$Y, Sn($R_{III}$)Y$_2$. In preferred embodiments, III is M or MY.

M can be a metal atom selected from the group consisting of Na, K, Zn, Ca, Cs, Mg, and Rb. M preferably is Na or K.

Y can be an anionic moiety such as, for example, OH, F, Cl, Br, I, an acetate, an acetyl acetonate, a sulfate, a chorate, a nitrate, enoxy, an oxime, or an amine. In preferred embodiments, Y is OH, Cl, or an acetate.

$R_{III}$ can be alkyl having 1 to about 10 carbon atoms, alkenyl having 2 to about 10 carbon atoms, or aryl having 3 to about 20 carbon atoms. In preferred embodiments, $R_{III}$ is an aryl group having 3 to about 20 carbon atoms.

Variable IV can be —HN—$R_{IV}$—NH$_2$, —$R_{IV}$N—$R_{IV}$—NHR$_{IV}$, —O—$R_{IV}$—OH, —O—$R_{IV}$—OR$_{II}$, —S—$R_{IV}$—SH, or —S—$R_{IV}$—SR$_{IV}$, preferably phenylenediamino or piperazino.

Variable V, can be Si($R_V$)$_3$, Si($R_V$)$_2$Y, Si($R_V$)Y$_2$, Sn($R_V$)$_3$, Sn($R_V$)$_2$Y, or Sn($R_V$)Y$_2$, preferably dibutyltin chloride, dimethyldichlorosilane, diphenyldichlorosilane, or dimethyldiacetoxysilane.

Variable VI can be Si($R_{VI}$)$_3$, Si($R_{VI}$)$_2$Y, Si($R_{VI}$)Y$_2$, Sn($R_{VI}$)$_3$, Sn($R_{VI}$)$_2$Y, or Sn($R_{VI}$)Y$_2$, preferably dibutyltin chloride, dimethyldichlorosilane, diphenyldichlorosilane, or dimethyldiacetoxysilane.

Variable VII can be Si($R_{VII}$)$_3$, Si($R_{VII}$)$_2$Y, Si($R_{VII}$)Y$_2$, Sn($R_{VII}$)$_3$, Sn($R_{VII}$)$_2$Y, or Sn($R_{VII}$)Y$_2$, preferably dibutyltin chloride, dimethyldichlorosilane, diphenyldichlorosilane, or dimethyldiacetoxysilane.

$R_V$, $R_{VI}$, and $R_{VII}$ can be alkyl having 1 to about 10 carbon atoms, alkenyl having 2 to about 10 carbon atoms, or aryl having 3 to about 20 carbon atoms, with alkyl groups being preferred.

As noted above, the polymers of the invention can be mixed with photoinitiators and ethylenically unsaturated compounds to form photocurable compositions. Monomers employed in the present invention should be compounded by extrusion or rotomixing. Those skilled in the art will recognize that such photocurable compositions optionally can further include a variety of reactive diluents, fillers, and dyes.

Photoinitiators according to the invention are compounds which generate radical species upon exposure to ultraviolet radiation of a suitable frequency. Representative photoinitiators include acetophenones (e.g., 2,2-dimethoxyl-2-phenylacetophenone, anthraquinones (e.g., 9,10-antraquinone, 1-chloroanthraquinone, 2-chloroantraquinone), benzophenones (e.g. p-aminobenzophenone, p-chloroanthraquinone), benzoin, benzoin methyl ether, benzoin ethyl ether, α-methylbenzoin.

Ethylenically unsaturated compounds according to the invention should have at least one terminal ethylenic group (i.e., at least one terminal carbon-carbon double bond). Such compounds include, for example, alkyl acrylates, alkyl methacrylates, and diacrylates and dimethacrylates of polyhydroxy compounds such as butanediol, dodecanediol, ethylene glycol, and propylene glycol. Preferred ethylenically unsaturated compounds are alkyl acrylates and diacrylates of alkyl diols.

The photocurable compositions of the invention should cross-link (cure) and, thereby, harden in at least some actinic wavelength region. As used herein, actinic radiation is radiation capable of effecting a chemical change in an exposed portion of the composition. Actinic radiation includes, for example, amplified (e.g., laser) and non-amplified light, particularly in the UV and infrared wavelength regions. Preferred actinic wavelength regions are from about 250 nm to about 450 nm, more preferably from about 300 nm to about 400 nm, even more preferably from about 320 nm to about 380 nm.

Such compositions can be used, for example, to prepare photocurable elements. This generally involves placing a layer of the photocurable composition 14 upon a suitable support, or backing, layer 12, as shown in FIG. 1 The support layer can be formed from a transparent or opaque material such as paper, cellulose film, plastic, or metal. In preferred embodiments, it is a polyethylene terephthalate film having a thickness on the order of about 0.005 inches. The photocurable layer need not have any particular thickness, but preferably is on the order of about 0.02 to 0.35 inches.

The photocurable elements of the invention can exist as cylinders or rectilinear sheets. As shown in FIG. 1, a photocurable element can further comprise a second layer of photocurable material 16, a cover sheet 18, as well as a transparent protective layer 17 disposed between the cover sheet and the "uppermost" photocurable layer. If a second hotocurable layer is used, it typically is disposed upon the first and is similar in composition but considerably thinner, usually less than 0.01 inches. The protective layer, sometimes referred to as the slip film, typically is from about 0.001 to about 0.01 inches thick. The protective layer protects the plate from contamination, increases ease of handling, and acts as an ink-accepting layer. The final layer, the cover sheet, can be formed from plastic or any other removable material that can protect the plate from damage until ready for use. Those skilled in the art will recognize that the exposure of the photocurable compositions to actinic radiation should be avoided (or at least minimized) prior to development of the photocurable printing element into which such compositions are incorporated.

Additional objects, advantages, and novel features of this invention will become apparent to those skilled in the art upon examination of the following examples thereof, which are not intended to be limiting.

EXAMPLE 1

A polymer according to the invention was formed by reacting 200 g of Hycar ATBN 1300X21 (BF Goodrich) with 9.8 g of maleic anhydride (Aldrich) for 5 minutes at 80° C. in a Haake rotomixer. Aqueous sodium hydroxide (4 g) was then added and a vacuum (>400 mm) was applied for 5 minutes. The resulting polymer was very clear, flexible, and does not cold flow.

A photocurable composition according to the invention was prepared by adding the monomers lauryl methacrylate (26 g) and 1,6-hexanediol diacrylate (13 g) to the polymer and allowing them to dissolve. A photoinitiator, Irgacure 651 (Ciba-Geigy) (5.2 g), and an anti-oxidant, butylated hydroxytoluene (BHT) (1.3 g), also are dissolved in the polymer.

An approximately 0.067 inch thick layer of the photocurable composition was then spread upon a polyethyleneterephthalate support. The resulting element was then exposed to UVA radiation (having wavelength of 350–400 nm) through a negative. Exposed portions of the composition hardened, while unexposed portions did not. The negative was removed and the element was washed with 2 weight percent $Na_2CO_3$ and 2 weight percent RW 150 (Union Carbide) at 135° F. at a rate of 2.3 mil/min.

The resilience of the washed plate was 58 percent, and its durometer was 55 Shore A. Its percent swell in water, isopropyl alcohol, and isopropyl alcohol/ethyl acetate (80/20 v/v) after 24 hours was 5, 11, and 27 percent, respectively.

EXAMPLE 2

A polymer according to the invention was formed by by reacting 200 g of Hycar ATBN 1300X50 (BF Goodrich) with 12.4 g of butane sultone (Aldrich) for 15 minutes at 60° C. in a Haake rotomixer. Aqueous potassium hydroxide (5.1 g) was then added and a vacuum (>400 mm) was applied for 10 minutes. The resulting polymer was very clear, flexible, and does not cold flow.

Photocurable compositions and photocurable elements comprising the resultant polymer are prepared following the general procedure of Example 1.

EXAMPLE 3

A polymer according to the invention was formed by reacting 200 g of R 45HT (Elf Atochem NA) with 16 g citraconic anhydride (Aldrich) and 1 g of methyl imidazole (Aldrich) for 30 minutes a 120° C. in a Haake rotomixer. Aqueous sodium hydroxide (5.7 g) was then added and a vacuum (>400 mm) was applied for 10 minutes. The resulting polymer was clear, flexible, and does not cold flow.

Photocurable compositions and photocurable elements comprising the resultant polymer are prepared following the general procedure of Example 1.

EXAMPLE 4

A polymer according to the invention was formed by reacting 200 g of Hycar ATBN 1300X50 (BF Goodrich) with 12.8 g of dichlorodiphenysilane (Aldrich) for 5 minutes at 35° C. in a Haake rotomixer. The resulting polymer was very clear, flexible, and does not cold flow.

Photocurable compositions and photocurable elements comprising the resultant polymer are prepared following the general procedure of Example 1.

EXAMPLE 5

A polymer according to the invention was formed by reacting 200 g of Hycar ATBN 1300X50 (BF Goodrich) with 12.8 g of dichlorodiphenysilane (Aldrich) for 5 minutes at 35° C. in a Haake rotomixer. The resulting polymer was very clear, flexible, and does not cold flow.

Photocurable compositions and photocurable elements comprising the resultant polymer are prepared following the general procedure of Example 1.

EXAMPLE 6

A polymer according to the invention is formed by reacting 200 g of poly(propylene glycol)bis(2-aminopropyl ether) (Jeffamine 2000, M-2000, Huntsman), 16.8 g of dimethyldiacetoxysilane (Gelest), 1.1 g of vinyltriacetoxysilane, and 1 g dibutyltin dilaurate (Aldrich) under dry air for 6 hours at 70° C. The resulting polymer is clear flexible, and does not cold flow.

Photocurable compositions and photocurable elements comprising the resultant polymer are prepared following the general procedure of Example 1.

Those skilled in the art will recognize that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A polymer having the formula:

[III] [II]-[i]-[I]-[i]-[II] [III]

wherein:
I is an elastomer having a glass transition temperature of about −30° C. or less;

each i, independently, is NH, $NR_i$, O, or S;

$R_i$ is alkyl having 1 to about 10 carbon atoms, cycloalkyl or heterocycloalkyl having 4 to about 6 carbon atoms, or aryl having 3 to about 20 carbon atoms;

each II, independently, is O(O)C—C(O)—, O(O)S—S(O)—, O(O)C—$R_{II}$—C(O)—, O(O)S—$R_{II}$—S(O)—, O(O)S—$R_{II}$—C(O)—, O(O)C—$R_{II}$—S(O)—, O(O)$_2$S—$R_{II}$—, or can have one of the formulas:

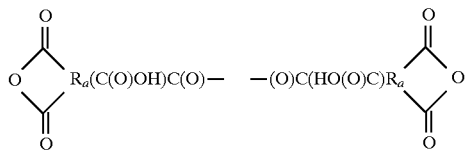

$R_{II}$ is alkyl having 1 to about 10 carbon atoms, cycloalkyl having 4 to about 10 carbon atoms, alkenyl having 2 to about 10 carbon atoms, or aryl having 3 to about 20 carbon atoms;

$R_a$ is an aryl group having 6 to about 14 carbon atoms;

each III, independently, is M, MY, $MY_2$, $N(R_{III})_3$, $NH(R_{III})_2$, $NH_2$ $(R_{III})$, $NH_3$, NH—$R_{III}$—$NH_2$, N—$(R_{III})_2$—NH, $Si(R_{III})_3$, $Si(R_{III})_2Y$, $Si(R_{III})Y_2$, $Sn(R_{III})_3$, Sn $(R_{III})_2Y$, $Sn(R_{III})$ $Y_2$ ;

M is Na, K, Zn, Ca, Cs, Mg, or Rb;

Y is OH, F, Cl, Br, I, an acetate, an acetyl acetonate, a sulfate, a chorate, a nitrate, enoxy, an oxime, or an amine; and $R_{III}$ is alkyl having 1 to about 10 carbon atoms, alkenyl having 2 to about 10 carbon atoms, or aryl having 3 to about 20 carbon atoms.

2. The polymer of claim 1 wherein said elastomer is a homopolymer or copolymer of butadiene, isoprene, or chloroprene.

3. A photocurable composition comprising a polymer according to claim 1 in admixture with a photoinitiator and an ethylenically unsaturated compound having at least one terminal ethylenic group.

4. A photocurable element comprising:
a support layer; and
a photocurable composition according to claim 3 disposed upon said support layer.

5. A process of developing a photocurable element according to claim 4 comprising exposing portions of said photocurable composition to actinic radiation for a time and under conditions effective to render said exposed portions substantially insoluble in aqueous solutions.

6. The product of the process of claim 5.

7. A process for preparing a polymer comprising the steps of:
providing a first component having formula:

[i']-[I]-[i']

wherein:
I is an elastomer having a glass transition temperature of about −30° C. or less;

each i', independently, is $NH_2$, $NHR_i$, OH, or SH; and
$R_i$ is alkyl having 1 to about 10 carbon atoms, cycloalkyl or heterocycloalkyl having 4 to about 6 carbon atoms, or aryl having 3 to about 20 carbon atoms;

forming a reaction product by reacting said first component with a second component having formula HO(O)C— C(O)OH, HO(O)C—C(O)X, HO(O)S—S(O)OH, HO(O)S—S(O)X, HO(O)C—$R_{II}$—C(O)OH, HO(O)C—$R_{II}$—C(O)X, HO(O)S—$R_{II}$—S(O)OH, HO(O)S—$R_{II}$—S(O)X, HO(O)S—$R_{II}$—C(O)OH, HO(O)S—$R_{II}$—C(O)X, HO(O)C—$R_{II}$—S(O)OH, HO(O)C—$R_{II}$—S(O)X, or one of the formulas:

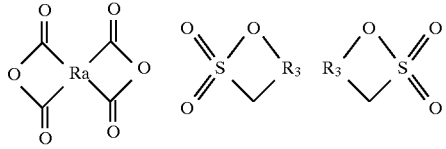

where:
X is a halogen; and $R_{II}$, is alkyl having 1 to about 10 carbon atoms, cycloalkyl having 4 to about 10 carbon atoms, alkenyl having 2 to about 10 carbon atom, or aryl having 3 to about 20 carbon atoms;

$R_a$ is an aryl group having 6 to about 14 carbon atoms; and forming said polymer by reacting said reaction product with a third component having formula MY, $MY_2$, $MY_3$, $N(R_{III})_3Y$, $NH(R_{III})_2Y$, $NH_2(R_{III})Y$, $NH_3Y$, YNH—$R_{III}$—$NH_2$, $Y_2N$—$(R_{III})_2$—NH, $Si(R_{III})_3Y$, $Si(R_{III})_2Y_2$, $Si(R_{III})Y_3$, Sn $(R_{III})_3Y$, Sn $(R_{III})_2Y_2$ , $Sn(R_{III})Y_3$, where $R_{III}$ is alkyl having 1 to about 10 carbon atoms, alkenyl having 2 to about 10 carbon atoms, or aryl having 3 to about 20 carbon atoms.

8. A polymer having the formula:

[V] [IV]-[ii]-[I]-[ii]-[IV] [V]

wherein:
I is an elastomer having a glass transition temperature of about −30° C. or less;

each ii, independently, is —C(O)— or —S(O)$_2$—;

each IV, independently, is —HN—$R_{IV}$—$NH_2$, —$R_{IV}N$—$R_{IV}$—$NHR_{IV}$, —O—$R_{IV}$—OH, —O—$R_{IV}$—$OR_{II}$, —S—$R_{IV}$—SH, or —S—$R_{IV}$—$SR_{IV}$;

each $R_{IV}$, independently, is alkyl having 1 to about 10 carbon atoms, cycloalkyl having 4 to about 10 carbon atoms, alkenyl having 2 to about 10 carbon atom, or aryl having 3 to about 20 carbon atoms;

each V, independently, is M, MY, $MY_2$, $Si(R_V)_3$, $Si(R_V)_2Y$, $Si(R_V)Y_2$, $Sn(R_V)_3$, $Sn(R_V)_2Y$, $Sn(R_V)Y_2$;

M is Na, K, Zn, Ca, Cs, Mg, or Rb;

Y is OH, F, Cl, Br, I, an acetate, an acetyl acetonate, a sulfate, a chorate, a nitrate, enoxy, an oxime, or an amine; and $R_V$ is alkyl having 1 to about 10 carbon atoms, alkenyl having 2 to about 10 carbon atoms, or aryl having 3 to about 20 carbon atoms.

9. The polymer of claim 8 wherein said elastomer is a homopolymer or copolymer of butadiene, isoprene, or chloroprene.

10. A photocurable composition comprising a polymer according to claim 8 in admixture with a photoinitiator and an ethylenically unsaturated compound having at least one terminal ethylenic group.

11. A photocurable element comprising:

a support layer; and a photocurable composition according to claim 10 disposed upon said support layer.

12. A process of developing a photocurable element according to claim 11 comprising exposing portions of said photocurable composition to actinic radiation for a time and under conditions effective to render said exposed portions substantially insoluble in aqueous solutions.

13. The product of the process of claim 12.

14. A process for preparing a polymer comprising the steps of:

providing a first component having formula:

[ii']-[I]-[ii'] 

wherein:

I is an elastomer having a glass transition temperature of about $-30°$ C. or less;

each ii', independently, $—C(O)OH$, $—C(O)X$, $—S(O)_2OH$, or $—S(O)_2X$; and

X is a halogen;

forming a reaction product by reacting said first component with a second component having formula $H_2N—R_{IV-NH2}$, $HR_{IV}N—R_{IV}—NHR_{IV}$, $HO—R_{IV}—OH$, $R_{IV}O—R_{IV-ORIV}$, $HS—R_{IV}—SH$, or $R_{IV}S—R_{IV}—SR_{IV}$; where:

each $R_{IV}$, independently, is alkyl having 1 to about 10 carbon atoms, cycloalkyl having 4 to about 10 carbon atoms, alkenyl having 2 to about 10 carbon atom, or aryl having 3 to about 20 carbon atoms; and forming said polymer by reacting said reaction product with a third component having formula $MY$, $MY_2$, $MY_3$, $Si(R_V)_3Y$, $Si(R_V)_2Y_2$, $Si(R_V)Y_3$, $Sn(R_V)_3Y$, $Sn(R_V)_2Y_2$, $Sn(R_V)Y_3$, where:

$R_V$ is alkyl having 1 to about 10 carbon atoms, alkenyl having 2 to about 10 carbon atoms, or aryl having 3 to about 20 carbon atoms.

15. A polymer having the formula:

[VI]-[iii]-[I]-[iii]-[VI] 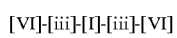

wherein:

I is an elastomer having a glass transition temperature of about $-30°$ C. or less;

each iii, independently, is $NH$, $NR_i$, $O$, or $S$;

$R_i$ is alkyl having 1 to about 10 carbon atoms, cycloalkyl or heterocycloalkyl having 4 to about 6 carbon atoms, or aryl having 3 to about 20 carbon atoms;

each VI, independently, is $Si(R_{VI})_3$, $Si(R_{VI})_2Y$, $Si(R_{VI})Y_2$, $Sn(R_{VI})_3$, $Sn(R_{VI})_2Y$, $Sn(R_{VI})Y_2$;

Y is OH, F, Cl, Br, I, an acetate, an acetyl acetonate, a sulfate, a chorate, a nitrate, enoxy, an oxime, or an amine; and $R_{VI}$, is alkyl having 1 to about 10 carbon atoms, alkenyl having 2 to about 10 carbon atoms, or aryl having 3 to about 20 carbon atoms.

16. The polymer of claim 15 wherein said elastomer is a homopolymer or copolymer of butadiene, isoprene, or chloroprene.

17. A photocurable composition comprising a polymer according to claim 15 in admixture with a photoinitiator and an ethylenically unsaturated compound having at least one terminal ethylenic group.

18. A photocurable element comprising:

a support layer; and a photocurable composition according to claim 17 disposed upon said support layer.

19. A process of developing a photocurable element according to claim 18 comprising exposing portions of said photocurable composition to actinic radiation for a time and under conditions effective to render said exposed portions substantially insoluble in aqueous solutions.

20. The product of the process of claim 19.

21. A process for preparing a polymer comprising the steps of:

providing a first component having formula:

[iii']-[I]-[iii'] 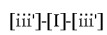

wherein:

I is an elastomer having a glass transition temperature of about $-30°$ C. or less;

each iii', independently, is $NH_2$, $NHR_i$, OH, or SH;

$R_i$ is alkyl having 1 to about 10 carbon atoms, cycloalkyl or heterocycloalkyl having 4 to about 6 carbon atoms, or aryl having 3 to about 20 carbon atoms; and reacting said first component with a second component having formula $Si(R_{VI})_3Y$, $Si(R_{VI})_2Y_2$, $Si(R_{VI})Y_3$, $Sn(R_{VI})_3Y$, $Sn(R_{VI})_2Y_2$, $Sn(R_{VI})Y_3$, where:

$R_{VI}$, is alkyl having 1 to about 10 carbon atoms, alkenyl having 2 to about 10 carbon atoms, or aryl having 3 to about 20 carbon atoms.

22. A polymer having the formula:

[VII]-[iv]-[I]-[iv]-[VII] 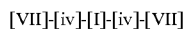

wherein:

I is an elastomer having a glass transition temperature of about $-30°$ C. or less;

each iv, independently, is $—C(O)—$ or $—S(O)_2—$;

each VII, independently, is $Si(R_{VII})_3$, $Si(R_{VII})_2Y$, $Si(R_{VII})Y_2$, $Sn(R_{VII})_3$, $Sn(R_{VII})_2Y$, $Sn(R_{VII})Y_2$;

Y is OH, F, Cl, Br, I, an acetate, an acetyl acetonate, a sulfate, a chorate, a nitrate, enoxy, an oxime, or an amine; and $R_{VII}$ is alkyl having 1 to about 10 carbon atoms, alkenyl having 2 to about 10 carbon atoms, or aryl having 3 to about 20 carbon atoms.

23. The polymer of claim 22 wherein said elastomer is a homopolymer or copolymer of butadiene, isoprene, or chloroprene.

24. A photocurable composition comprising a polymer according to claim 22 in admixture with a photoinitiator and an ethylenically unsaturated compound having at least one terminal ethylenic group.

25. A photocurable element comprising:

a support layer; and a photocurable composition according to claim 24 disposed upon said support layer.

26. A process of developing a photocurable element according to claim 25 comprising exposing portions of said photocurable composition to actinic radiation for a time and under conditions effective to render said exposed portions substantially insoluble in aqueous solutions.

27. The product of the process of claim 26.

28. A process for preparing a polymer comprising the steps of:

providing a first component having formula:

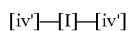

wherein:
I is an elastomer having a glass transition temperature of about −30° C. or less;
each iv', independently, is —C(O)OH, —C(O)X, —S(O)$_2$OH, or —S(O)$_2$X where X is a halogen; and reacting said first component with a second component having formula Si(R$_{VII}$)$_3$Y, Si(R$_{VII}$)$_2$Y$_2$, Si(R$_{VII}$)Y$_3$, Sn(R$_{VII}$)$_3$Y, Sn(R$_{VII}$)$_2$Y$_2$, Sn(R$_{VII}$)Y$_3$, where:
R$_{VII}$ is alkyl having 1 to about 10 carbon atoms, alkenyl having 2 to about 10 carbon atoms, or aryl having 3 to about 20 carbon atoms.

* * * * *